No. 745,360. PATENTED DEC. 1, 1903.
W. A. LAW.
HAY SLING.
APPLICATION FILED FEB. 14, 1903.
NO MODEL.
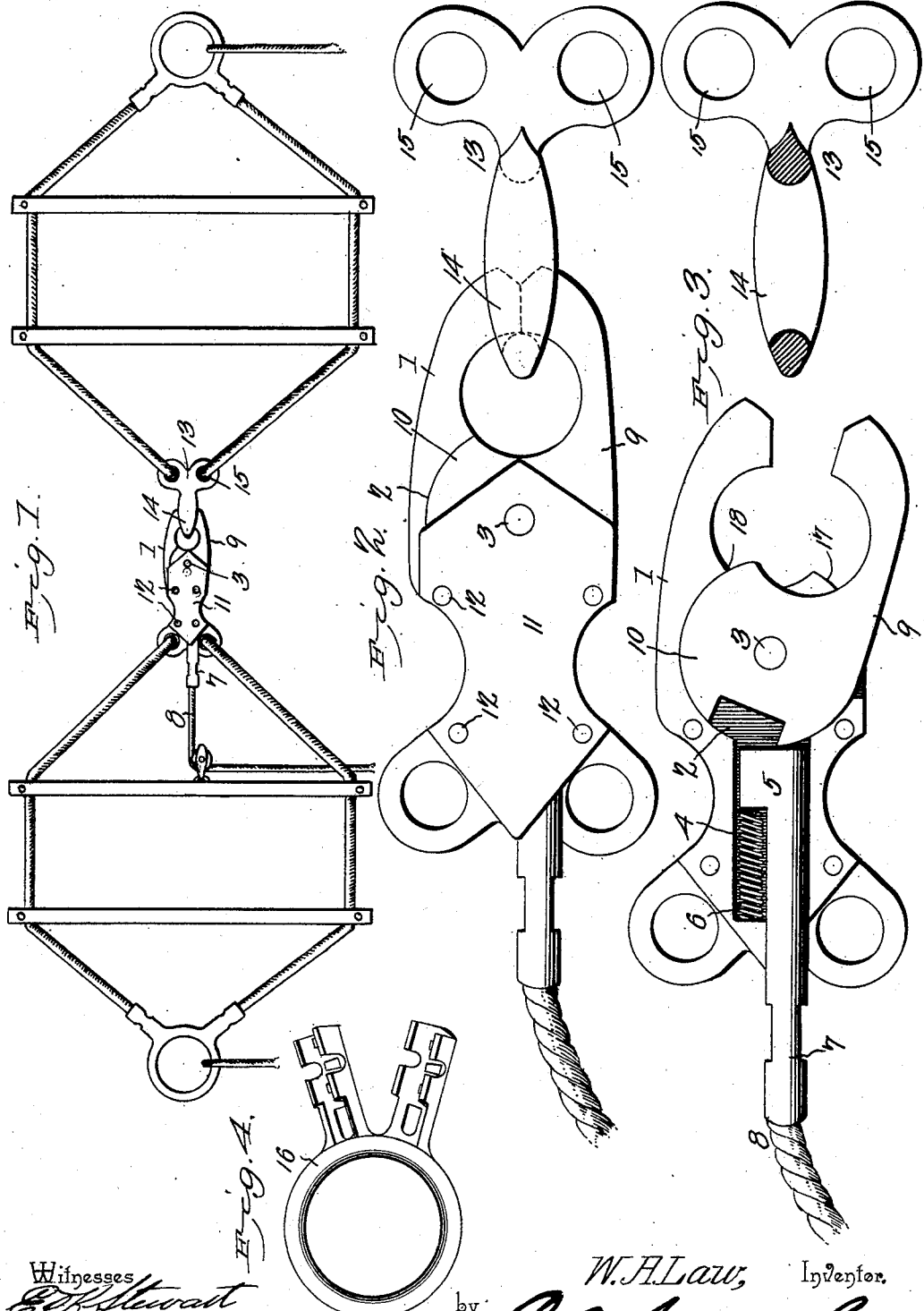

No. 745,360. Patented December 1, 1903.

UNITED STATES PATENT OFFICE.

WILLIAM A. LAW, OF MERRIAM PARK, MINNESOTA.

HAY-SLING.

SPECIFICATION forming part of Letters Patent No. 745,360, dated December 1, 1903.

Application filed February 14, 1903. Serial No. 143,411. (No model.)

*To all whom it may concern:*

Be it known that I, WILLIAM A. LAW, a citizen of the United States, residing at Merriam Park, in the county of Ramsey and State of Minnesota, have invented a new and useful Hay-Sling, of which the following is a specification.

My invention relates generally to hay-slings, particularly to a central coupling for the two load-supporting members of the sling proper.

The principal object contemplated in my invention is to produce a coupling of simple and inexpensive construction and reliable action by means of which the sling members may be automatically coupled by merely jamming the two members of the coupling together and which may be instantly uncoupled when it is desired to disconnect the sling members.

In the accompanying drawings, Figure 1 is a plan view of a hay-sling equipped with improved coupling. Fig. 2 is a plan view of the coupling complete with members coupled.
Fig. 3 is a view in plan of the members of the coupling separated with the cover-plate over the interior mechanism removed from the male member of the coupling and a portion of the female member of the coupling being broken away to show the construction thereof. Fig. 4 shows, on a larger scale, one of the eyes with attached rope-sockets which form the ends of the sling-sections.

Referring to the drawings by reference characters, 1 represents the frame of the male member of the coupling, which is provided at its forward end with a prolongation which forms a jaw and has at is rearward end a pair of eyes for the attachment of the ropes forming one of the sections of the hay-sling. The frame member 1 is provided with a socket 2 of substantially circular outline and having a pivoted pin 3 centrally mounted therein. Extending rearward from the socket 2 is a recess 4, which forms a seat for the sliding bolt 5, which is normally pressed forward by means of the spring 6. The bolt 5 has a stem 7, which is narrower than its head, and this stem projects through an opening at the rearward end of the recess 4 to form an eye, into which is fastened an operating-lanyard 8. The lanyard 8 passes backward from its point of attachment to the sliding bolt 5 through an eye provided on one of the braces of the adjacent member of the hay-sling and then extends downward or to one side, where it may be conveniently grasped to withdraw the bolt 5 against the tension of the spring.

Pivotally mounted on the pin 3 is a movable member 9, having at its forward end a prolongation which forms a jaw of similar form to that provided on the frame member and arranged to contact therewith. At its rearward end the movable member is formed into a head 10 of substantially circular outline adapted to fit into the socket 2. A portion of the head 10 is cut away to form a recess, into which the bolt 5 will fit when the jaws of the movable member and the frame member are brought into contact.

The sliding bolt 5, its actuating-spring 6, and the movable member 9 are retained in the recess provided for their reception in the frame member 1 by means of a plate 11, secured to the frame member 1 by means of rivets or screws 12 12.

Coöperating with the mechanism described in the foregoing paragraphs and forming the male member of the coupling is a female member 13, consisting, essentially, of a large ring or eye 14, with which the jaws of the main coupling member are adapted to engage, and a pair of smaller rings or eyes 15 15, arranged in a plane at right angles to that of the large ring 14 and adapted to receive the cords forming the sides of one of the sections of the hay-sling. The large ring 14 is made of such thickness that it will just pass easily between the jaws of the main coupling member when they are distended to the full extent permitted by their circular head and socket connection.

Instead of the member 13 described in the foregoing paragraph I may use as the female member a modification of the structure indicated at 16. This structure comprises a ring and two rope-clamps secured thereto and extending outward at approximately an angle of ninety degrees to each other. In the modification which I propose to substitute for the member 13 the ring would be disposed at right angles to the plane in which the two rope-clamps lie. The advantages resulting from the use of such structure instead of the member 13 would be the avoidance of the necessity for knotting or splicing the ends of the cords after they are passed through the eyes 15 15 by clamping them in the clamps which serve instead of the eyes 15 15.

When the jaws of the male coupling member are closed, as shown in Fig. 2, they form what is practically a ring of smooth interior; but when opened, as shown in Fig. 3, a shoulder 17 on the main member and a similar shoulder 18 on the pivoted member project into the ring formed by the two jaws. The shoulders 17 and 18 are provided to form means for closing the jaws of the main coupling member as soon as the member 13 is forced home into the space between the jaws.

The operation of my improved coupling will be readily understood from the foregoing description and the accompanying drawings. When the male and female members are separated, as shown in Fig. 3, they may be coupled by merely forcing the member 13 against the shoulders 17 and 18, which project into the open space between the jaws of the main member. The pressure of the member 13 between the shoulders 17 and 18 tends to separate them and to bring the jaws together. As soon as the two jaws are in contact the pressure of the spring 6 forces the bolt 5 into the recess adapted to receive it provided in the head 10 of the movable member 9. This of course locks the two jaws in closed position, and they remain closed until the bolt 5 is withdrawn from the recess in the head 10 by means of a pull upon the lanyard 8.

By means of the construction above described I obtain a form of coupling in which the number of working parts are reduced to a mimimum, in which the closure is almost automatic, and which cannot be released without withdrawing the locking-bolt from its recess in the head 10 of the movable member 9. When it is desired to disconnect the members of the coupling, their release is brought about instantly by a pull upon the lanyard connected with the bolt 5, for as soon as the bolt is withdrawn from the recess in the head of the member 9 the pull upon the member 13 causes the two jaws to separate and permits the member 13 to escape from its position between them.

In preventing accidental separation of the coupling members in case the pivot 3 on which the movable member 9 is mounted should break the head 10 and the socket 2 are completely effective. It will be observed that the outline of the socket 2 is substantially circular and that the part cut away to permit the movement of the movable member 9 is considerably less than half its circumference. Consequently even when the pivot 3 is broken it is impossible for the member 9 to be removed from the socket without first removing the plate 11, which is fastened to the frame member 1. When the bolt 5 is in engagement with the recess provided in the head 10, it is not only impossible for the head to become disengaged from its socket if the pivot breaks, but it cannot be rotated therein, and consequently the separation of the jaws of the main coupling member is completely prevented.

It is understood that I have reserved the right to make such changes in the form, proportions, and the exact mode of assemblage of the parts of my improved coupling as may be made without departing from the spirit of my invention.

Having thus described the construction and operation of my invention, what I claim as new, and desire to secure by Letters Patent, is—

1. The combination in a coupling device of a pair of pivotally-connected members each provided at its forward end with a jaw, said jaws being oppositely curved and adapted to contact with each other when closed, a sliding bolt carried by one of said members and adapted to engage the recesses on the other member to lock said jaws in closed position.

2. The combination in a coupling device of a male coupling member provided with a pair of pivoted jaws, means for locking said jaws in closed position, and a shoulder on each of said jaws adapted to be engaged by a female coupling member when passed between said jaws and forced home against the main coupling member, whereby said jaws will be automatically closed.

3. The combination in a coupling device of a frame member provided with a jaw and having a substantially circular socket, a movable member also provided with a jaw and having a substantially circular head adapted to fit the socket on said frame member, a locking-bolt carried by said frame member and a recess provided in the circular head of said movable member and adapted to be engaged by said locking-bolt when the jaws on said frame member and said movable member are closed.

4. The combination in a coupling device of a frame member provided with a jaw and having a substantially circular socket with a pivot centrally mounted therein, a movable member also provided with a jaw and having a substantially circular head adapted to fit into the socket on said frame member and rotatably mounted on said pivot a locking-bolt carried by said frame member, and a recess provided in the head of said removable member and adapted to be engaged by said locking-bolt when the jaws of the movable member and the frame member are closed.

In testimony that I claim the foregoing as my own I have hereto affixed my signature in the presence of two witnesses.

WILLIAM A. LAW.

Witnesses:
C. N. MOORE,
I. N. BOOTH.